United States Patent
Trainin et al.

(10) Patent No.: US 8,335,203 B2
(45) Date of Patent: Dec. 18, 2012

(54) SYSTEMS AND METHODS FOR POLLING FOR DYNAMIC SLOT RESERVATION

(75) Inventors: Solomon Trainin, Haifa (IL); Assaf Kasher, Haifa (IL)

(73) Assignee: Intel Corporation, Santa Clara, CA (US)

( * ) Notice: Subject to any disclaimer, the term of this patent is extended or adjusted under 35 U.S.C. 154(b) by 1163 days.

(21) Appl. No.: 12/215,911

(22) Filed: Jun. 30, 2008

(65) Prior Publication Data

US 2009/0232112 A1 Sep. 17, 2009

Related U.S. Application Data

(60) Provisional application No. 61/035,480, filed on Mar. 11, 2008.

(51) Int. Cl.
  H04W 72/04 (2009.01)
  H04W 74/06 (2009.01)
  H04W 4/00 (2009.01)
  H04B 7/212 (2006.01)
  H04J 3/16 (2006.01)

(52) U.S. Cl. ........ 370/346; 370/337; 370/338; 370/347; 455/450; 455/509; 455/63.4; 455/562.1

(58) Field of Classification Search .................. 370/337, 370/338, 346, 347; 455/450, 509, 63.4, 562.1
  See application file for complete search history.

(56) References Cited

U.S. PATENT DOCUMENTS

| | | | |
|---|---|---|---|
| 6,233,466 B1 * | 5/2001 | Wong et al. ................. | 455/562.1 |
| 6,745,038 B2 * | 6/2004 | Callaway et al. .......... | 455/456.1 |
| 6,823,186 B2 * | 11/2004 | Salokannel et al. ........ | 455/452.1 |
| 6,973,335 B2 * | 12/2005 | Ganton ......................... | 455/573 |
| 7,006,530 B2 * | 2/2006 | Spinar et al. .................. | 370/468 |
| 7,099,671 B2 * | 8/2006 | Liang ............................ | 455/450 |
| 7,110,380 B2 * | 9/2006 | Shvodian ...................... | 370/336 |
| 7,113,536 B2 * | 9/2006 | Alriksson et al. ............. | 375/132 |
| 7,146,164 B2 * | 12/2006 | Hunzinger .................... | 455/423 |
| 7,245,947 B2 * | 7/2007 | Salokannel et al. .......... | 455/574 |
| 7,280,517 B2 * | 10/2007 | Benveniste ................... | 370/338 |
| 7,415,279 B2 * | 8/2008 | Liang ............................ | 455/450 |
| 7,433,697 B2 * | 10/2008 | Karaoguz et al. ............. | 455/458 |
| 7,453,832 B2 * | 11/2008 | Steer et al. .................... | 370/278 |
| 7,460,834 B2 * | 12/2008 | Johnson et al. ............. | 455/63.4 |
| 7,463,886 B2 * | 12/2008 | Salokannel et al. ........ | 455/426.1 |
| 7,548,552 B2 * | 6/2009 | Shvodian et al. ............. | 370/449 |
| 7,672,382 B2 * | 3/2010 | Yoshida et al. ............... | 375/260 |
| 7,809,835 B2 * | 10/2010 | Reunamaki et al. .......... | 709/227 |

(Continued)

OTHER PUBLICATIONS

Trainin et al., "60 GHZ WPAN MAC and PHY Features", U.S. Appl. No. 61/035,480, filed Mar. 11, 2008, 204 pages.

(Continued)

*Primary Examiner* — Alpus H Hsu
(74) *Attorney, Agent, or Firm* — Schubert Law Group PLLC

(57) ABSTRACT

Embodiments include systems and methods for allocating time to a plurality of devices in the network of a piconet controller. Embodiments comprise selectively directing a steerable antenna beam of the piconet controller to a plurality of devices in succession during a polling process to receive time allocation requests from one or more of the devices. Subsequent to the polling process, a grant procedure is performed wherein a device is granted permission to transmit in a subsequent time interval. Also during the grant process, one or more devices are instructed to receive from the device granted permission to transmit. The polling process and the grant process occur in the same superframe.

25 Claims, 7 Drawing Sheets

U.S. PATENT DOCUMENTS

| | | | |
|---|---|---|---|
| 7,822,000 B2 * | 10/2010 | Sekhar | 370/337 |
| 7,890,116 B2 * | 2/2011 | Salokannel et al. | 455/452.1 |
| 2003/0108059 A1 * | 6/2003 | Yew et al. | 370/443 |
| 2004/0196822 A1 | 10/2004 | Proctor, Jr. | |
| 2005/0002362 A1 | 1/2005 | Kim et al. | |
| 2005/0002372 A1 * | 1/2005 | Rune et al. | 370/346 |
| 2005/0075142 A1 | 4/2005 | Hoffmann et al. | |
| 2006/0164969 A1 | 7/2006 | Malik et al. | |
| 2006/0215601 A1 * | 9/2006 | Vleugels et al. | 370/328 |
| 2007/0002809 A1 * | 1/2007 | Reunamaki et al. | 370/338 |
| 2007/0060160 A1 | 3/2007 | Hur et al. | |
| 2008/0233875 A1 * | 9/2008 | Desai et al. | 455/41.2 |
| 2008/0291873 A1 * | 11/2008 | Benveniste | 370/329 |
| 2009/0253438 A1 * | 10/2009 | Chater-Lea et al. | 455/456.1 |

OTHER PUBLICATIONS

International Search Report and Written Opinion received for PCT Patent Application No. PCT/US2009/036645, mailed on Oct. 22, 2009, 12 pages.

International Preliminary Report on Patentability and Written Opinion received for PCT Patent Application No. PCT/US2009/036645, mailed on Sep. 23, 2010, 6 pages.

Office Action from corresponding application in China, 200910149725.6, mailed Nov. 1, 2011; 23 pages.

* cited by examiner

SYSTEMS AND METHODS FOR POLLING FOR DYNAMIC SLOT RESERVATION

PRIORITY CLAIM

This application claims priority of U.S. Application No. 61/035,480 filed on 11 Mar. 2008.

FIELD

This written description relates to the field of wireless computing. More particularly, the written description relates to the field of Time Division Multiple Access (TDMA) mode of communication between wireless devices.

BACKGROUND

"Wireless computing" is a term that has come to describe wireless communications between computing devices, which include computers and peripheral devices. For example, many computers, including tower and laptop models, have a wireless communications card that comprises a transmitter and receiver connected to an antenna. This enables the computer to communicate by Radio Frequency (RF) transmission with a network of computers and peripheral devices. The flexibility and mobility that wireless computing affords is a major reason for its commercial success.

In a wireless environment, principal systems are placed in communication through wireless links. Thus, a transceiver (transmitter and receiver) enables a computer to wirelessly connect to a network of wirelessly-connected computers and peripheral devices such as printers and scanners that are also equipped with transceivers.

DETAILED DESCRIPTION OF EMBODIMENTS

Figure 1:
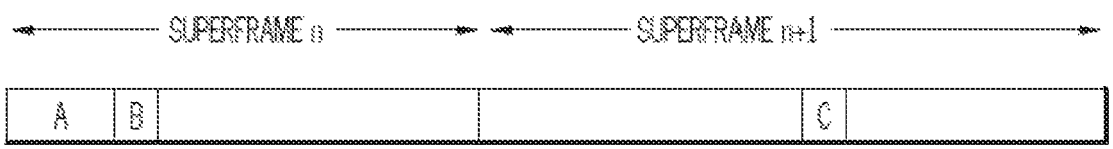
FIG. 1 depicts an embodiment of a conventional way of receiving by a piconet controller (PNC) a request from a wireless device to transmit, and allocation of a time slot in a next subsequent superframe.

The following is a detailed description of embodiments depicted in the accompanying drawings. The embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

The wireless communication systems described and discussed herein are intended to represent any of a wide variety of wireless systems. These systems may include, without limitation, NFC (Near Field Communications), WPAN (Wireless Personal Area Network), WLAN (Wireless Local Area Network), WMAN (Wireless Metropolitan Area Network), WiMAX (Worldwide Interoperability for Microwave Access), 2.5-3G (Generation) cellular, 3G RAN (Radio Access Network), 4G, RFID (Radio Frequency Identification), etc. These systems may also comprise systems that conform to wireless standards in development or to be developed.

Embodiments include systems and methods for allocating time to a plurality of devices in the network of a piconet controller. Embodiments comprise selectively directing a steerable antenna beam of the piconet controller to a plurality of devices in succession during a polling process to receive time allocation requests from one or more of the devices. When more than one time allocation request is received, the system selects one to enable transmit in a subsequent interval of time. Subsequent to the polling process, a grant procedure is performed wherein a device is granted permission to transmit in a subsequent time interval. Also during the grant process, one or more devices are instructed to receive from the device granted permission to transmit. The polling process, the grant process and the subsequent transmission during the allocated time occur in the same superframe. In some embodiments, a requested time duration is transmitted in a transmit request sent by a device during the polling process.

Due to high signal Radio Frequency (RF) loss when transmitting at very high carrier frequencies, such as 60 GHz, over the air, highly directive antennas are being used to achieve substantially increased range between electronic devices that consume very high data rates, such as rates on the order of Giga bits per second (Gbps). For communication between peer devices, each peer will use highly directive antenna beams for both transmission and receiving. An example of data that requires very high data rates in wireless transmission is uncompressed High Definition Television (HDTV). When transmitting and receiving in the millimeter range, beam forming may be used to achieve spatial diversity. However, CSMA (carrier sense multiple access) becomes inefficient and TDMA (Time Division Multiple Access) is used instead.

A known problem with TDMA is the slow responsiveness of time slot allocation. FIG. 1 shows a conventional method of allocating a time slot in response to a request from a requesting device in the network of a piconet controller (PNC). At the beginning of the superframe n, (interval A), the time slot allocations for the superframe are made and may be communicated to nearby devices by the PNC. In FIG. 1, the PNC receives a request from a device for a time allocation for the device during superframe n, (interval B). Thus, during a portion of the superframe n time, the PNC listens in a broadcast mode for requests from the devices in the PNC's network. During this listening time collisions may occur when requests from two or more devices are received at the same time. According to conventional methods, the device requesting a time slot allocation will wait for about one super-frame time duration before the device is able to use the allocated time slot. In particular, at the beginning of superframe n+1, the PNC announces (broadcasts) the new time slot allocations made in response to the request received in superframe n. During superframe n+1, the time slot allocated to the device is used by the device.

The conventional method of time slot allocation is very inefficient. For example, a device that requires a peak bit rate in a critical time period should allocate the full Constant Bit Rate bandwidth to be sure that it will receive the requested service in time. As a result, the time that the device does not use is lost. In other words, during off-peak times, the device is not using the full amount of time allocated. If there are enough reserved slots and each slot can be allocated rapidly, during the same superframe as when the request for time is received, this would solve the Constant Bit Rate allocation problem without the aforementioned utilization penalty. In present embodiments, the device will get the minimum time it needs during off-peak times. Other time slots may be reserved and can be allocated to different devices in the network dynamically. Then the reserved bandwidth can be allocated to a first device immediately as it needs it.

A problem is how to share the time dynamically in an efficient way and to spend only a small amount of time for the allocation. This problem applies to piconets with a centralized Piconet controller (PNC) which performs the scheduling for transmissions between devices in the network. In some cases, a slot may already be reserved for certain pairs of devices (such a pair is called a link), but due to the nature of directed transmission, the slot may be used in parallel by another link without any interference. The PNC contains a memory of such links and allocates the link according to time reservation requests. So there is also a need for dynamic allocation of the slots that are already reserved by some link but that still may be allocated to other links.

Figure 2:
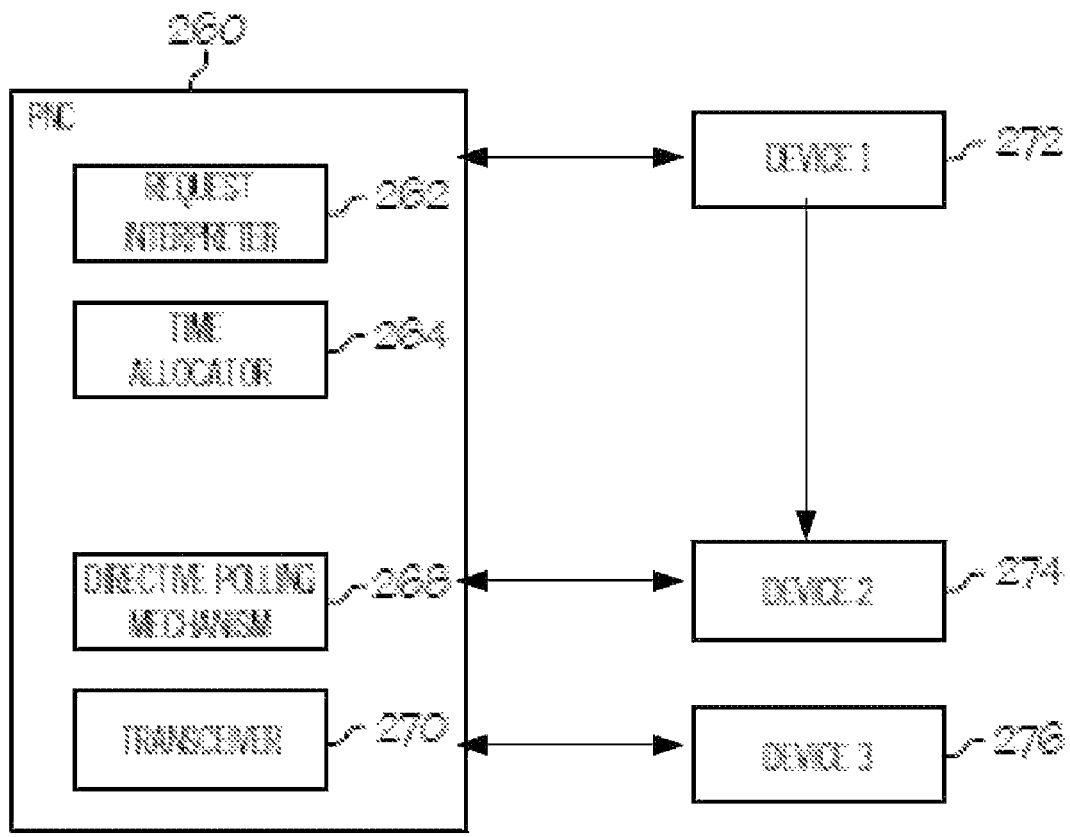
FIG. 2 depicts an embodiment of a PNC with a directive polling mechanism to selectively poll individual devices within the network of the PNC and with a transceiver to transmit and receive.
Figure 3:
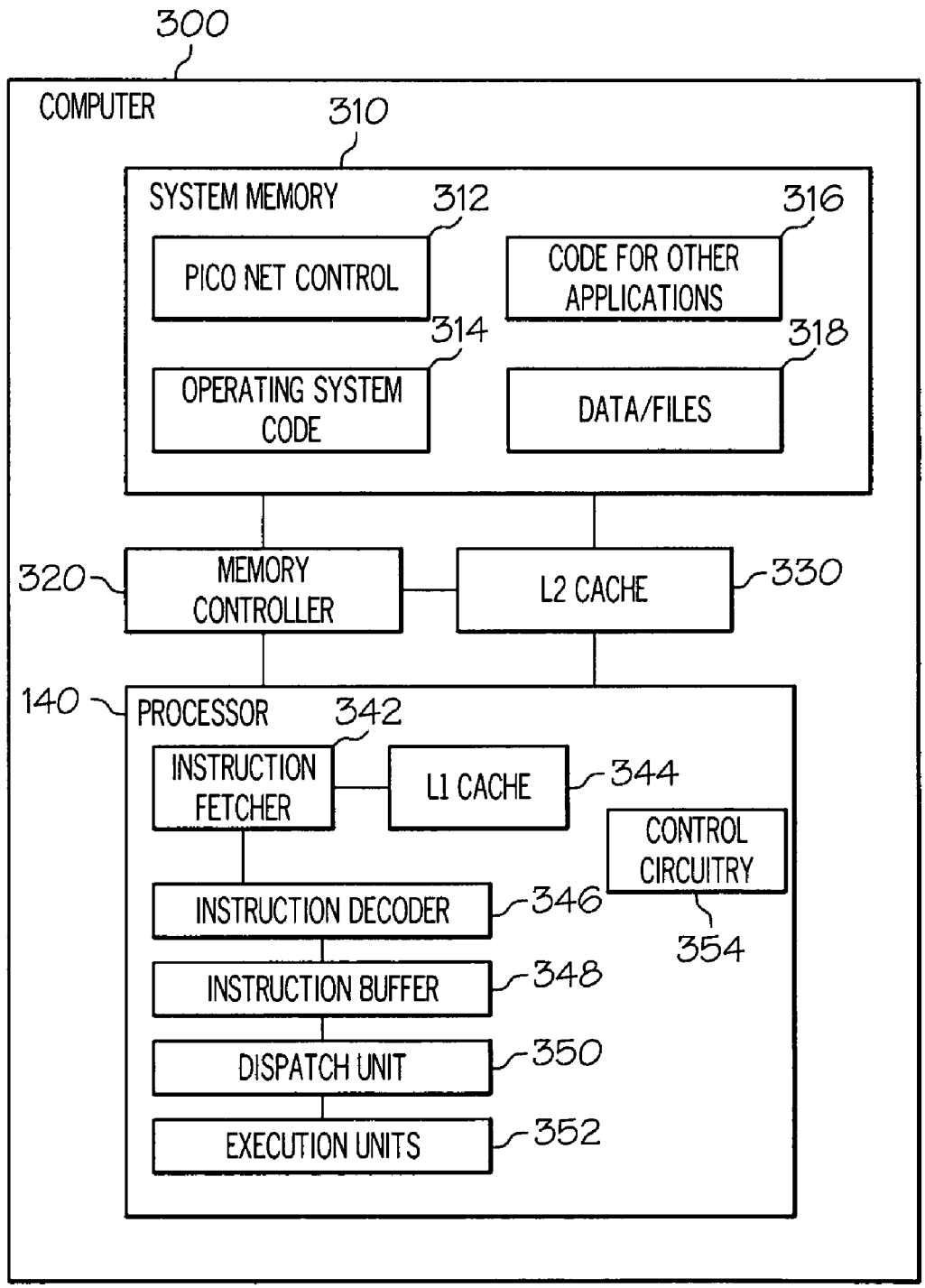
FIG. 3 depicts an embodiment of a computer that may be found in some embodiments of a PNC.

FIG. 2 shows a PicoNet Controller (PNC) 260 to control communications between devices 272, 274, 276. Devices 272, 274 and 276 may be computers, as shown in FIG. 3, or other devices such as printers, scanners, etc. Further, the functions of PNC 260 may be implemented by a computer, such as shown in FIG. 3, executing Pico Net Control code 312. Alternatively, PNC 260 may be implemented by application specific circuitry. In one embodiment, PNC 260 comprises a request interpreter 262, a time allocator 264, a directive polling mechanism 268, and a transceiver 270. One embodiment of transceiver 270 is shown in FIG. 4.

PNC 260 controls communications between the devices 272, 274, and 276. During a polling phase of operation, directive polling mechanism 268 polls each device 272, 274 and 276, one by one to receive requests from the devices. This is done by first pointing a directive antenna of transceiver 270 to device 1, then pointing to device 2, etc. When pointing to device 1, polling mechanism 268 sends a message to device 1 in order to prompt device 1 to send a request for a time slot allocation if there is such a need for the time requested. When prompted by the polling message, device 1 sends its request for a time slot allocation, if it has such a request. A request for transmit time by a device contains the addresses of the devices designated to receive the transmission during the allocated time. The polling mechanism 268 of PNC 260, then causes the antenna of transceiver 270 to point to device 2. When pointing at device 2, the polling mechanism 268 then seeks a request for time slot allocation from device 2. Then, the polling mechanism 268 moves to device 3, etc.

Each time a request is received from one of the devices, request interpreter 262 interprets the request. For example, the request from device 1 may be to transmit to device 2. In response, a time allocator 264 will allocate a duration of time for device 1 to transmit to device 2. Thus, after polling of each device is complete, transceiver 270, then again points only to devices the allocation applies to communicate the allocation. For example, transceiver may point to device 1 to communicate a grant of permission to transmit to device 2 in a subsequent time slot within the same superframe during which the polling occurred. After communicating this grant of permission to transmit, the transceiver 270 then points to device 2 and instructs it to receive from device 1 during the allocated time slot of the same superframe. The time duration allocated to a device for transmission may be specified in the transmit request sent to the piconet controller by the device during the polling process. Thus, the polling process is followed by a grant process. In some embodiments, both the polling process and the grant process occur during the same superframe.

Figure 4:
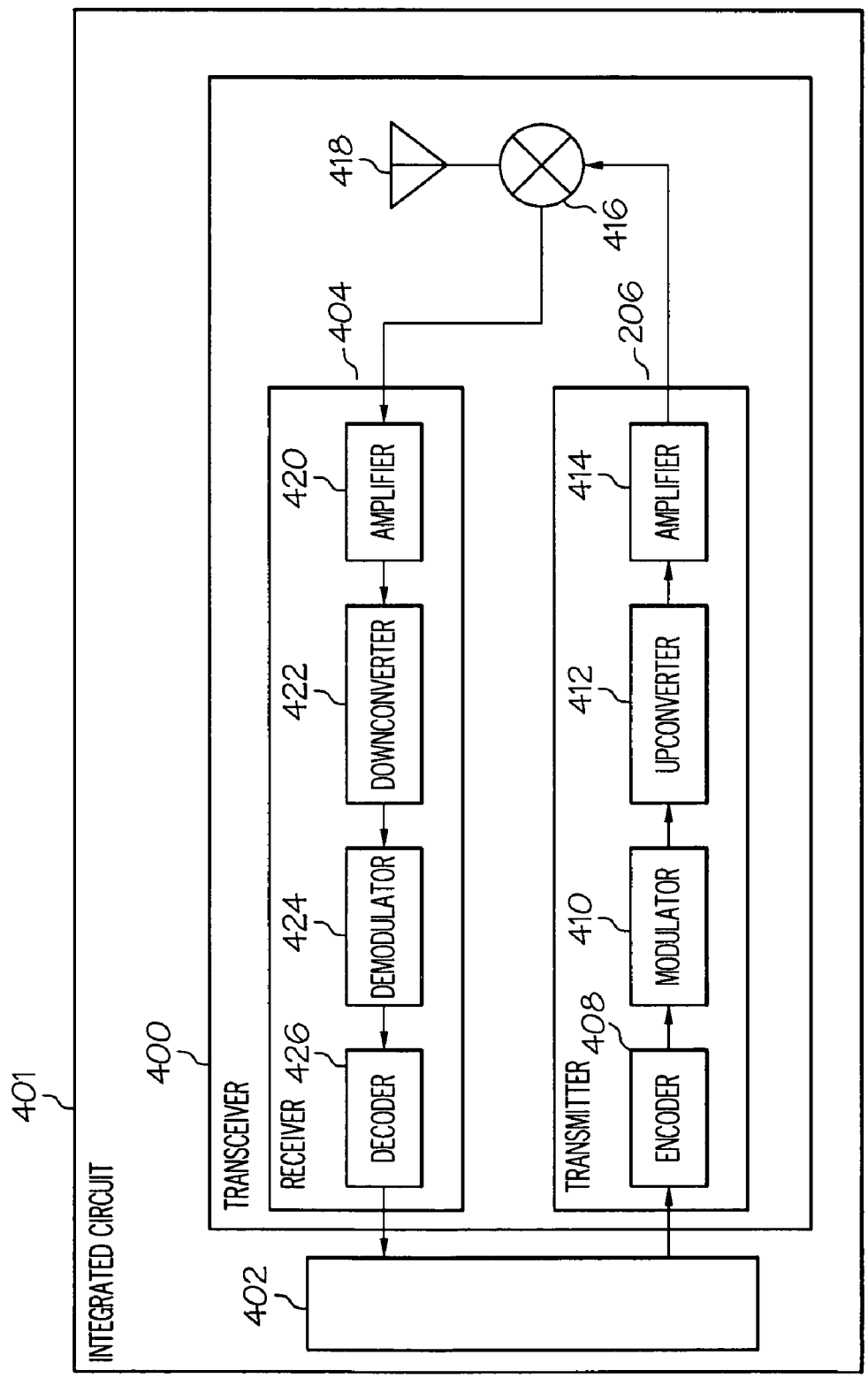
FIG. 4 depicts an embodiment of a transceiver that may be found in a PNC and in a wireless device in a network of the PNC.

FIG. 3 shows a more detailed view of a computer 300 connected to a transceiver, as shown in FIG. 4, to communicate with wireless devices. A computer 300 may be found in an embodiment of PNC 260 or in one or more of wireless devices 272, 274, 276. Herein, a wireless device is one that— while it may have wires—principally communicates with other devices by RF or optical transmission. Computer 300 comprises a system memory 310, a memory controller 320, an L2 cache 330, and a processor 340. System memory 310 comprises a hard disk drive memory, Read-Only Memory (ROM), and Random Access Memory (RAM). System memory 310 stores PicoNet control code 312, Operating System (OS) code 314, Basic Input-Output System (BIOS) code (not shown), and code for other application programs 316. System memory 310 also stores data and files 318. The PicoNet Control code 312, Operating System code 314, and applications code 316, are typically stored on a hard drive, whereas BIOS code is typically stored in ROM. In contrast, the L2 cache 330 is fast dynamic Random Access Memory (RAM).

Memory controller 320 effectuates transfers of instructions and data from system memory 310 to L2 cache 330 and from L2 cache 330 to an L1 cache 344 of processor 340. Thus, blocks of data and instructions are transferred from a hard drive of memory 310 to L2 cache near the time when they will be needed for execution in processor 340. L2 cache 330 is fast memory located physically close to processor 340. Instructions may include load and store instructions, branch instructions, arithmetic logic instructions, floating point instructions, etc. L1 cache 344 is located in processor 340 and contains data and instructions received from L2 cache 330. Ideally, as the time approaches for a program instruction to be executed, the instruction is passed with its data, if any, first to the L2 cache, and then as execution time is near imminent, to the L1 cache.

In addition to on-chip level 1 cache 344, processor 340 also comprises an instruction fetcher 342, instruction decoder 346, instruction buffer 348, a dispatch unit 350, execution units 352 and control circuitry 354. Instruction fetcher 342 fetches instructions from memory. Instruction fetcher 342 maintains a program counter and fetches instructions from L1 cache 330. A program counter of instruction fetcher 342 comprises an address of a next instruction to be executed. Instruction fetcher 342 also performs pre-fetch operations. Thus, instruction fetcher 342 communicates with a memory controller 320 to initiate a transfer of instructions from the system memory 310, to instruction cache L2 330, and to L1 instruction cache 344. The place in the cache to where an instruction is transferred from system memory 310 is determined by an index obtained from the system memory address. A tag identifies the instruction in the cache.

Instruction fetcher 342 retrieves instructions passed to instruction cache 344 and passes them to an instruction decoder 346. Instruction decoder 346 receives and decodes the instructions fetched by instruction fetcher 342. An instruction buffer 348 receives the decoded instructions from instruction decoder 346. Instruction buffer 348 comprises memory locations for a plurality of instructions. Instruction buffer 348 may reorder the order of execution of instructions received from instruction decoder 346. Instruction buffer 348 therefore comprises an instruction queue to provide an order in which instructions are sent to a dispatch unit 350 of processor 340.

Dispatch unit 350 dispatches instructions received from instruction buffer 348 to execution units 352. In a superscalar architecture, execution units 352 may comprise load/store units, integer Arithmetic/Logic Units, floating point Arithmetic/Logic Units, and Graphical Logic Units, all operating in parallel. Dispatch unit 350 therefore dispatches instructions to some or all of the executions units to execute the instructions simultaneously. Execution units 352 comprise stages to perform steps in the execution of instructions received from dispatch unit 350. Data processed by execution units 352 are storable in and accessible from integer register files and floating point register files not shown. Thus, instructions are executed sequentially and in parallel.

FIG. 3 also shows control circuitry 354 to perform a variety of functions that control the operation of processor 300. For example, an operation controller within control circuitry 354 interprets the OPCode contained in an instruction and directs the appropriate execution unit to perform the operation indicated by the OPCode. Also, control circuitry 354 may comprise a branch redirect unit to redirect instruction fetcher 342 when a branch is determined to have been mispredicted. Control circuitry 354 may further comprise a flush controller to flush instructions younger than a mispredicted branch instruction. Computer 300 further comprises other components and systems not shown in FIG. 1, including, RAM, peripheral drivers, a system monitor, a keyboard, flexible diskette drives, removable non-volatile media drives, CD and DVD drives, a pointing device such as a mouse, etc. Computer 300 may be a personal computer, a workstation, a server, a mainframe computer, a notebook or laptop computer, etc.

FIG. 4 shows one example embodiment of an integrated circuit 401 comprising a transceiver unit 400 which may be integrated onto the same die as a processor core 402 and its related circuitry. For example, the transceiver of FIG. 4 may be in a piconet controller, wherein processor core 402 executes computer code to perform the functions of the piconet controller, as described herein. Transceiver 400 is representative of a transceiver found in PNC 260 or devices 272, 274, 276. Transceiver 400 comprises a receiver 404 and a transmitter 406. Receiver 404 receives RF communication signals and transmitter 406 transmits RF communication signals. Some embodiments of a transmitter comprise an encoder 408, a modulator 410, an upconverter 412, and an amplification stage 414. Some embodiments of a receiver comprise an amplification stage 420, a downconverter 422, a demodulator 424 and a decoder 426. Transceiver 400 also comprises an antenna or multiple antennas 418. Each of these components of transceiver 400 and their functions will now be described.

Encoder 408 of transmitter 406 receives data destined for transmission from processor core 402. Processor core may present data to transceiver 400 in blocks such as bytes of data. Encoder 408 encodes the data using any one of a number of algorithms now known or to be developed. Encoding may be done to achieve one or more of a plurality of different purposes. For example, encoding may be performed to decrease the average number of bits that must be sent to transfer each symbol of information to be transmitted by transceiver 406. Encoding may be performed to decrease a probability of error in symbol detection at a receiver. Thus, an encoder may introduce redundancy to the data stream. Adding redundancy increases the channel bandwidth required to transmit the information. However, adding redundancy results in less error, and enables the signal to be transmitted at lower power. Encoding may also comprise encryption for security.

One type of encoding is block encoding. In block encoding, the encoder encodes a block of k information bits into corresponding blocks of n code bits, where n is an integer greater than k. Each block of n bits from the encoder constitutes a code word in a set of $M=2^k$ possible code words. An example of a block encoder that can be implemented is a Reed-Solomon encoder, known by those skilled in the art of encoding. Another type of encoding is linear convolutional encoding. The convolutional encoder may be viewed as a linear finite-state shift register with an output sequence comprising a set of linear combinations of the input sequence. The number of output bits from the shift register for each input bit is a measure of the redundancy in the code. Thus, different embodiments may implement different encoding algorithms.

Modulator 410 of transmitter 406 receives data from encoder 408. A purpose of modulator 410 is to transform each block of binary data received from encoder 408 into a unique continuous-time waveform that can be transmitted by an antenna upon upconversion and amplification. The modulator impresses the received data blocks onto a sinusoid of a selected frequency. More specifically, the modulator maps the data blocks into a corresponding set of discrete amplitudes of the sinusoid, or a set of discrete phases of the sinusoid, or a set of discrete frequency shifts relative to the frequency of the sinusoid. The output of the modulator is a band pass signal that is upconverted to a transmission frequency, amplified, and delivered to an antenna.

In one embodiment, modulator 410 maps a sequence of binary digits into a set of discrete amplitudes of a carrier frequency. This is called Pulse Amplitude Modulation (PAM). Quadrature Pulse Amplitude Modulation (QPAM) is attained by impressing two separate k-bit symbols from the information sequence onto two quadrature carriers denoted $\cos(2\pi f_c t)$ and $\sin(2\pi f_c t)$.

In another embodiment, modulator 410 maps the blocks of data received from encoder 408 into a set of discrete phases of the carrier to produce a Phase-Shift Keyed (PSK) signal. An M-phase PSK signal is generated by mapping blocks of $k=\log_2 M$ binary digits of an input sequence into one of M corresponding phases $\theta=2\pi(m-1)/M$ for m a positive integer less than or equal to M. A resulting equivalent low pass signal may be represented as $$u(t) = \sum_{n=\infty}^{\infty} e^{j\theta_n} g(t - nT)$$

where g(t−nT) is a basic pulse whose shape may be optimized to increase the probability of accurate detection at a receiver by, for example, reducing inter-symbol interference. Inter-symbol interference results when the channel distorts the pulses. When this occurs adjacent pulses are smeared to the point that individual pulses are difficult to distinguish. A pulse shape may therefore be selected to reduce the probability of symbol misdetection due to inter-symbol interference.

In yet another embodiment, modulator 410 maps the blocks of data from an information sequence received from encoder 408 into a set of discrete frequency shifts to produce a Frequency-Shift-Keyed (FSK) signal. A resulting equivalent low pass signal may be represented as:

$$u(t) = \sum_{n=0}^{\infty} \exp(j\pi\Delta f t I_n) g(t - nT)$$

where $I_n$ is an odd integer up to M−1 and $\Delta f$ is a unit of frequency shift. Thus, in a Frequency Shift Keyed signal, each symbol of an information sequence is mapped into one of M frequency shifts.

Persons of ordinary skill in the art will recognize that the mathematical equations discussed herein are exemplary and illustrative, and that different mathematical expressions may be used to represent the pertinent signals to be operated upon by modulator 410. Also, other forms of modulation that may be implemented in modulator 410 are known by persons of ordinary skill in the art. For example, a combination of Pulse Amplitude Modulation (PAM) and Phase Shift Keying (PSK) can be implemented to produce a PAM-PSK signal. Alternatively, Orthogonal Frequency Division Multiplexing (OFDM) can be implemented. Persons of skill in the art will also recognize that modulation may occur at base band or at an intermediate frequency.

The output of modulator 410 is fed to the upconverter 412. A purpose of upconverter 412 is to shift the modulated waveform received from modulator 410 to a much higher frequency. Shifting the signal to a much higher frequency before transmission enables use of an antenna of practical dimensions. That is, the higher the transmission frequency, the smaller the antenna can be. Thus, for example, one may implement an embodiment to operate at a nominal carrier frequency of 60 GHz (Giga-Hertz). The required bandwidth of the transmitted signal depends, in part, upon the method of modulation by modulator 410. A bandwidth of about 6 GHz (10%) is exemplary. At a transmission frequency of about 60 GHz, a wavelength is about 5 millimeters (mm) so antenna dimensions can be on the order of a few millimeters. This is comparable to circuit wiring dimensions of integrated circuits in CMOS. Thus, a small millimeter wave antenna or an array of antennas can be well integrated with the circuitry of the die. Another advantage of a 60 GHz carrier is that the band is not already used for computer communications.

A typical upconverter 412 will multiply the modulated waveform by a sinusoidal signal to obtain a signal with a carrier frequency that is the sum of the central frequency of the waveform and the frequency of the sinusoid. The operation is based on the trigonometric identity:

$$\sin A \cos B = \frac{1}{2}[\sin(A + B) + \sin(A - B)]$$

In some embodiments, therefore, the signal at the sum frequency (A+B) is passed to a filter and amplifier 414 and the signal at the difference frequency (A−B) is filtered out. Thus, a band pass filter is provided to ideally filter out all but the information to be transmitted, centered at the carrier (sum) frequency.

The encoded, modulated, upconverted, filtered signal is passed to amplifier 414. In an embodiment, amplifier 414 provides high power amplification to drive the antenna 418. However, the power does not need to be very high to be received by receivers in close proximity to transmitter 406. The distances between transceivers within embodiments of a multi-transceiver system may be small. Thus, one may implement a transmitter of moderate or low power output capacity. The required RF transmitter power to effectuate communications depends, therefore, on the expected distance between wireless devices that are in communication. Where the distances are great, more power is generally required. In addition, the directivity of the antenna of the wireless device will affect the amount of power required to maintain communications.

FIG. 4 also shows a diplexer 416 connected to antenna 418. Thus, in this embodiment, a single antenna or multiples antennas are used for both transmission and reception. When transmitting, the signal from amplifier 414 passes through diplexer 416 and drives the antenna with the upconverted information-bearing signal. The diplexer prevents the signal from amplifier 414 from entering receiver 404. When receiving, an information bearing signal received by the antenna 418 passes through diplexer 416 to deliver the signal from antenna 418 to receiver 404. While receiving, the diplexer prevents the received signal from entering transmitter 406. Thus, diplexer 416 operates as a switch to alternately connect the antenna to the receiver and the transmitter.

In another embodiment, two separate antennas may be used for transmit and receive and a diplexer is not employed. Thus, transmitter 406 would drive a transmitting antenna or multiple antennas, and receiver 404 would receive from a separate receiving antenna or multiple antennas. When there are separate antennas, transmission and reception can occur simultaneously. In a Frequency Duplex (FD) configuration, RF transmission occurs at one frequency, while RF reception occurs at a second frequency. Thus, one transceiver will transmit at frequency $f_a$ and receive at frequency $f_b$, while another transceiver receives at $f_a$ and transmits at $f_b$. When two separate antennas are employed for transmission and reception, transmission and reception may occur at the same time.

In embodiments discussed herein, an antenna 418 found in a transceiver of PNC 260 is selectively directive. Antennas found in a transceiver of a device 272, 274, and 276 may also be selectively directive. Thus, in one embodiment, antenna 418 may be a steerable phased array antenna comprising a plurality of antenna elements. In another embodiment, antenna 418 may comprise a plurality of switchable antennas, each antenna pointing in a different direction (toward a different device). In some embodiments, the antennas of the PNC and the devices in the PNC's network are trained beforehand to know which way to steer to point the directive antenna beam to a selected device.

In addition to, or instead of, Frequency Duplexing, embodiments herein also employ Time Division Multiple Access (TDMA). In TDMA, the communication signal is divided into multiple sequential time slots. One time slot is for transmission of information to a first receiver and another time slot is for transmission of information to a second receiver. In Frequency duplex, while a time slot is used for transmission, reception can occur in the same time interval. Thus, in a TDMA configuration, data from a single processor 402 can be multiplexed and transmitted to different receivers sequentially in different time slots. In the same way, a receiver can receive information during two different time slots from two different transmitters.

A transmit antenna 418 radiates the information bearing signal into a time-varying, spatial distribution of electromagnetic energy that can be received by an antenna of a receiver. The receiver can then extract the information of the received signal. Each antenna may comprise a single antenna element or an array of antenna elements. In one embodiment, antenna 418 is controllably directive to achieve Space Division Multiple Access (SDMA). Thus, a phased array of antenna elements may be steered to direct the central beam of a transmitting antenna to a particular receiver. Similarly, the beam in the radiation pattern of a receive antenna can be steered to a particular transmitter. Further, Space Division Multiple Access may be implemented in conjunction with other multiple access methods such as Time Division Multiple Access.

Antennas 418 can easily be implemented using existing printed circuit board metallization technologues. Thus, microstrips, striplines, slotlines, patches, and notches, for example, are all candidates for antennas 418. As noted, at a frequency of about 60 GHz (Giga-Hertz), printed circuit board antenna elements can be small, on the order of a few millimeters. Thus, an array of antenna elements can be integrated on a single die with the transceiver 400 and other circuitry, including, in some embodiments, the processor of the wireless device. Alternatively, an array of antenna elements may be printed on a printed circuit board separate from the transceiver to receive the modulated signal from transceiver circuitry integrated onto the die with the processor circuitry. Thus, a chip with a processor and receiver integrated thereon may have pin-outs to antenna elements printed on the same circuit board that holds the chip.

FIG. 4 also shows an exemplary embodiment of a receiver 404 for receiving, amplifying, down-converting, demodulating, and decoding an information bearing signal. The signal is fed from antenna 418 to a low noise amplifier 420. Amplifier 420 comprises filter circuitry which passes the desired signal information and filters out noise and unwanted signals at frequencies outside the pass band of the filter circuitry. A downconverter 422 downconverts the signal at the carrier frequency to an intermediate frequency or to base band. Again, this is accomplished based on the above-mentioned trigonometric identity by multiplying the received signal times a sinusoid to obtain a difference frequency. Filtering accepts the signal at the difference frequency and rejects the signal at the sum frequency. Persons of ordinary skill in the art will recognize implementations of more than one stage of downconversion. By shifting the received signal to a lower frequency or to baseband, the function of demodulation is easier to perform.

The demodulator 424 demodulates the received, downconverted signal. Demodulation is the process of extracting the information content from the received downconverted signal to produce an information signal. Demodulation may occur at an intermediate frequency or at baseband. The method of demodulation depends on the method by which the information is modulated onto the received signal. Thus, for example, if the modulation is Phase Shift Keying (PSK), demodulation involves phase detection to convert phase information to a sequence of binary data. Demodulation thus provides to the decoder 426 a sequence of bits of information. Decoder 426 decodes the received binary data blocks from demodulator 424 and transmits the decoded information to processor core 402. The method of decoding depends upon how the signal was encoded by the device that transmitted the coded signal.

The topology of the transceiver of FIG. 4 is merely representative. Also, persons of ordinary skill in the art will recognize that a receiver and transmitter will comprise numerous additional components and circuitry that is not shown in FIG. 4. These devices and circuitry may typically include a reference oscillator, a frequency divider, filtering circuitry, synchronization circuitry, possibly multiple frequency conversion stages and multiple amplification stages, etc.

Thus, some embodiments comprise a piconet controller for allocating time slots for wireless devices in a network of the piconet controller. The piconet controller comprises memory to store time duration allocation information and to store requests to transmit received from one or more of the devices in the network. The piconet controller also comprises a processor to poll each of the devices in succession by changing the direction of an antenna of the piconet controller. The processor also receives transmit requests from one or more of the devices, and grants permission to transmit to one of the devices and permission to receive by one or more other of the devices. The piconet controller also comprises a transceiver with a selectively directive antenna to communicate polling messages and permission grants to the devices and to receive transmit requests from the devices.

In some embodiments, the processor of the piconet controller further selects according to specified criteria which of a plurality of devices requesting permission to transmit will be granted permission to transmit next. In some embodiments, the processor further specifies a transmit time duration allocated to a transmitting device. In some embodiments, the transmit request itself specifies a requested time duration for transmission. In some embodiments, the selectively directive antenna of the transceiver comprises a steerable phased array antenna.

Figure 5:
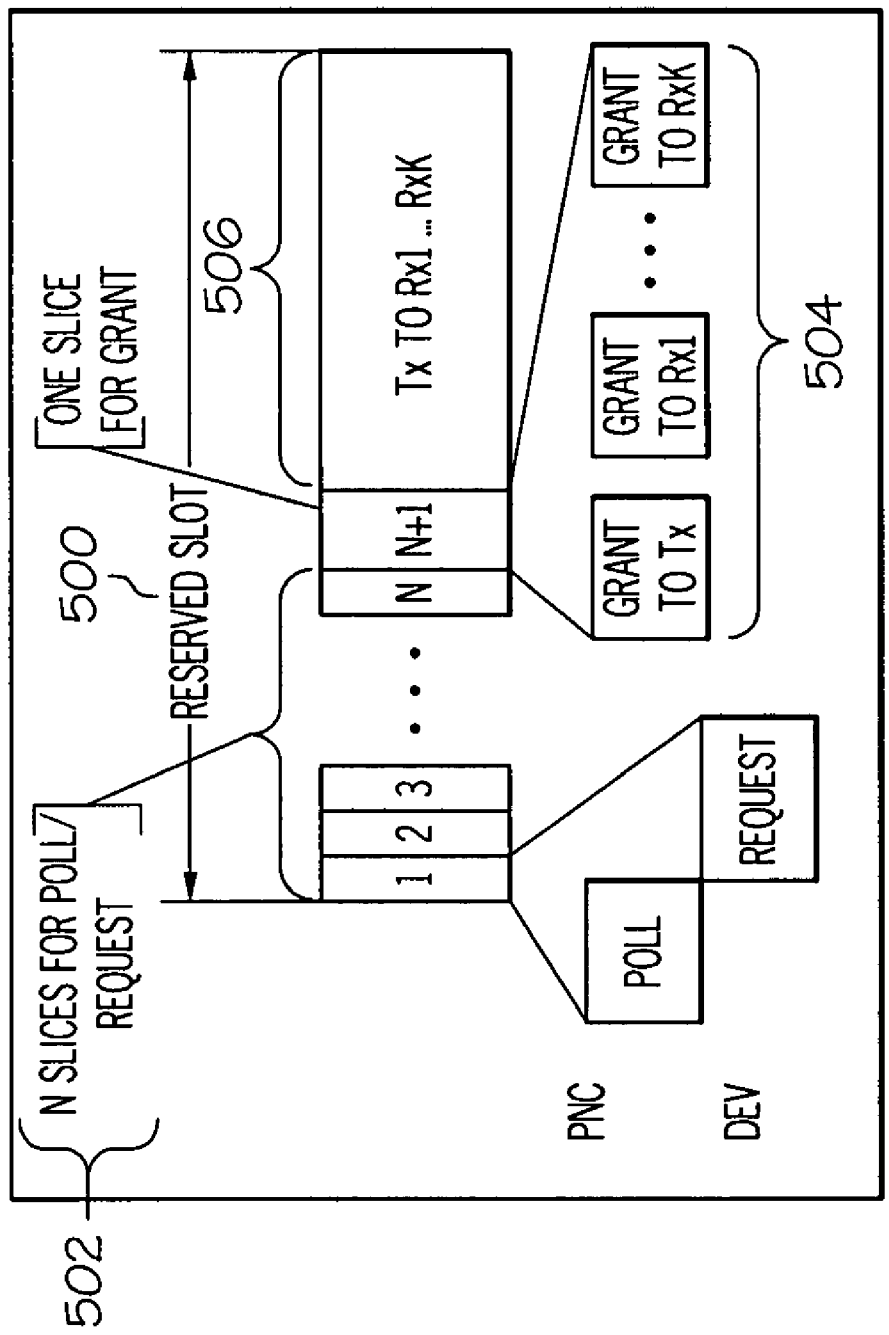
FIG. 5 depicts an allocation of a reserved time slot for providing time slices for polling, for granting permission to transmit and receive, and a time duration for transmitting.

FIG. 5 shows division of a portion of a superframe according to embodiments described herein. The first N slices 502 of a reserved slot 500 are for polling by polling mechanism 268 when there are N different devices to be polled. Thus, in time slice 1, device 1 is polled and a request from device 1 may be received during slice 1. During time slice 2, device 2 is polled, etc. After the polling, during time slice N+1, 504, PNC 260 then directively transmits to each device. For example, if during polling, device 1 requests to transmit to devices 2 and 3 simultaneously, or sequentially, then during time slice N+1, device 1 receives from PNC 260 a grant of permission to transit, whereas devices 2 and 3 are instructed to receive during the allocated time interval. Subsequent to time slice N+1, the requested transmission from device 1 to devices 2 and 3 occurs in time interval 506. The request and execution of the request occurs in the same superframe, thus overcoming the inefficient methods of the prior art. Note also that multiple reserved slots 500, as shown in FIG. 5, can occur in the same superframe, thereby further increasing efficiency.

Thus, the polling mechanism as disclosed herein uses highly directive radiation at high transmission rates. To support polling, the slot is structured as shown in FIG. 5. There are a few slices that are used for the polling and receiving the device requests and another slice for the PNC grant to the various devices. The number of polling slices is equal to the number of polled devices. The polling message sent to a device during polling contains an address of the polled device so that the polled device knows that the polling message is for it and not another device. The request sent in return by the device contains the addresses of the receiving devices. The grant slice 504 communicates the grants of permission to transmit and receive according to the requests received from the devices.

Note that it is possible that during polling, the PNC 260 may receive a request to transmit by more than one device. In that event, an algorithm known in the art or to be developed in the future may establish a priority of one device over another so that during the time interval 506, only one device is transmitting, and one or more of the other devices is receiving. One such algorithm is a simple round robin method, wherein each requesting device is granted permission to transmit in its turn.

Figure 6:
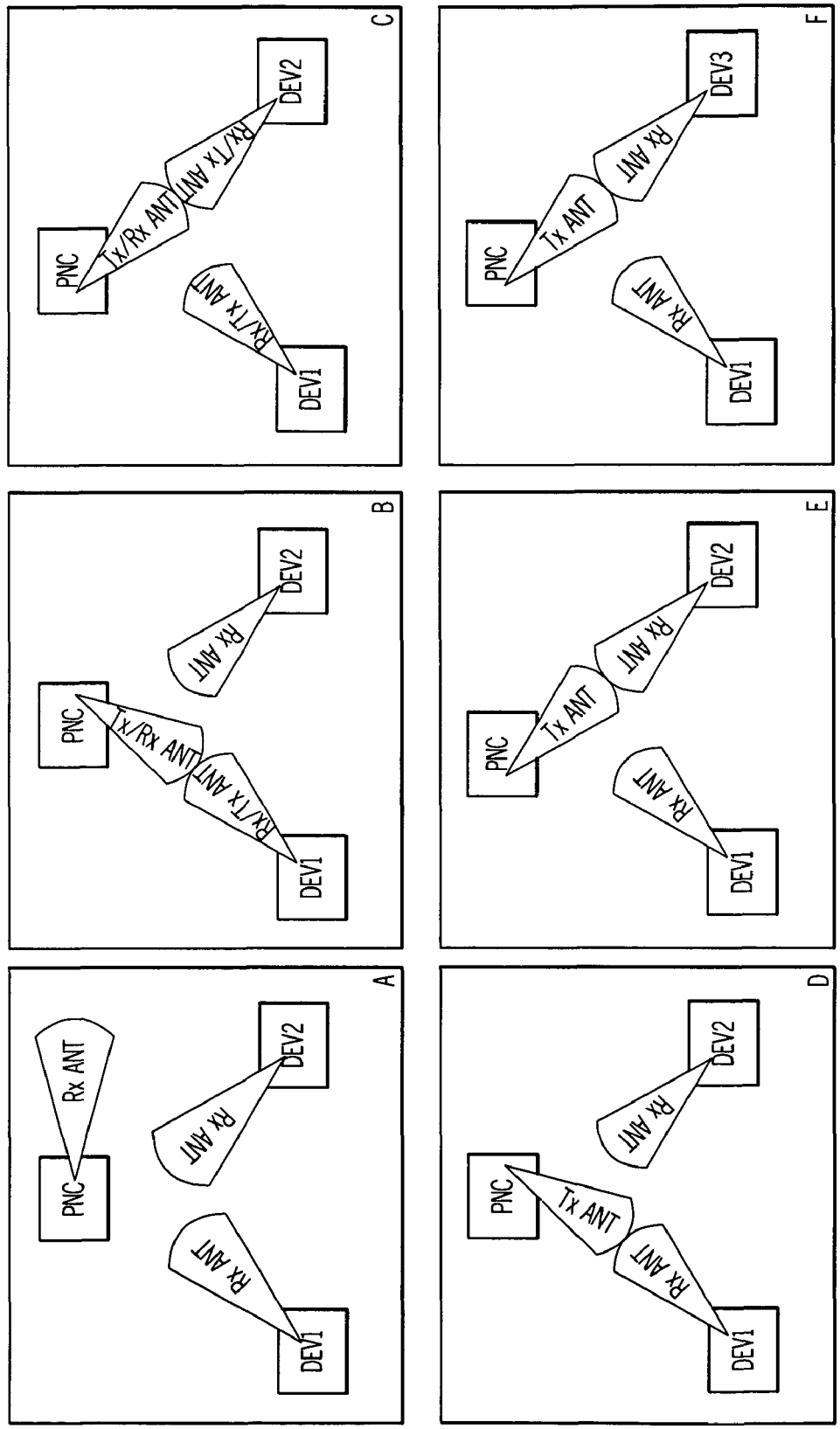
FIG. 6 depicts an embodiment showing the directionality of antennas of a PNC and devices in the network of the PNC during the steps of polling and granting permission to transmit and receive.

FIG. 6 depicts a polling process and the grant process. In some embodiments, the steps comprise the following:
1. Each device associated with a piconet controller (PNC) is initially trained to know what direction to point its antenna beam to cause directed transmission and receiving from and to the PNC and to and from other devices. Thus, each device and the PNC learn where to point their beams to communicate with each other.

2. During an initial part of the superframe, the PNC broadcasts to all the devices time slot allocation information, which may include what time slots are available for allocation to the devices.
3. Initially, at the beginning of the polling process, the directive antenna of each device is directed to the PNC to get polling messages. FIG. 6A shows each device pointing its antenna beam to the PNC to listen for polling messages.
4. During polling of a first device, DEV 1, the PNC directs its transmitting antenna to the direction of DEV 1 and sends a polling message to the device. The PNC then switches to a reception mode to receive a request from the device. Thus, FIG. 6B shows the beam of the PNC pointing to DEV 1.
5. The device DEV 1, with its antenna pointing to the PNC, answers a polling message with the allocation request that contains addresses of the receivers it wants to transmit to during an available slot.
6. The polling process repeats with device DEV 2, FIG. 6C, and any other devices in the system.
7. The PNC decides whom to give the grant of permission to transmit. This decision is necessary when, during polling, the PNC receives a transmit request from more than one of the devices. A transmit request may comprise the addresses of devices to transmit to. In some embodiments, the transmit request comprises a duration of time requested to inform the PNC of the time needed for the device to transmit.
8. During the grant slice, 504, the PNC first adjusts its transmitting antenna to the chosen transmitting device, (DEV 1 in FIG. 6D), and sends to the device a message that contains the address of the device, and tells the device that it is granted permission to transmit during the allocated time, and may also designate when transmission is to begin, and how long transmission is to occur.
9. Also during the grant slice, the PNC adjusts its transmitting antennas to point successively at each of the receiving devices (as in FIGS. 6E and 6F) and sends to each one a message that contains the address of the device from which it will receive a transmission during the allocated time slot, and may also inform the receiving devices when the transmission will occur.

Figure 7:
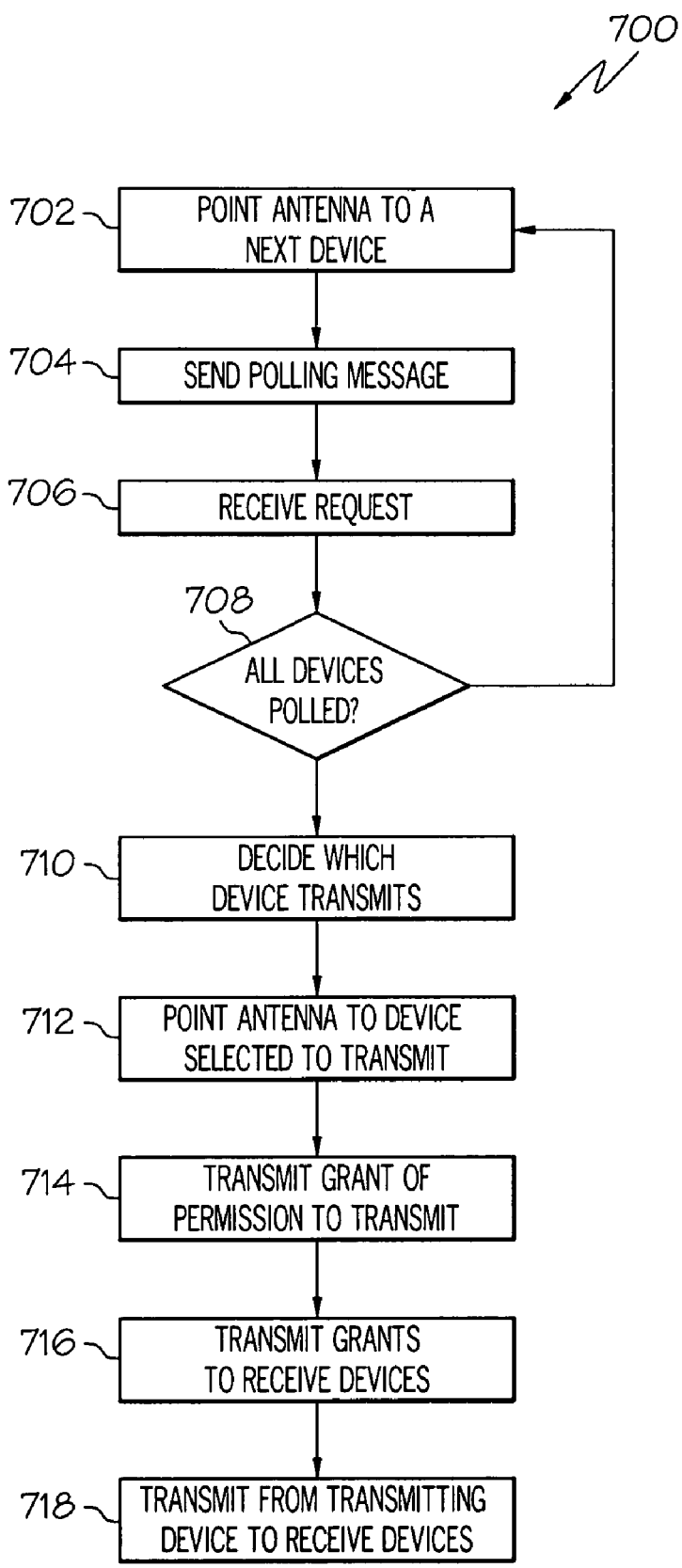
FIG. 7 depicts an embodiment of a flow chart for polling, granting permissions, and transmitting between devices.

FIG. 7 shows a flow chart 700 of an embodiment for directive polling and granting time allocations, and executing a request, all within a single superframe. First, the antenna of the PNC points its directive transmit antenna to a device (either the first one or a subsequent one not yet polled) (element 702). While pointing its directive transmit antenna to the device, the PNC sends a polling message (element 704). The polling message may contain the address of the currently-pointed-at device, and time slot duration availability. Then, the PNC points its receive antenna at the device and receives a request (if any) from the device (element 706). The request may contain a request to transmit and the address of the device(s) to transmit to.

Then, the PNC determines if all devices have been polled (element 708). If not, then a next one of the devices is polled (element 702). If all the devices have been polled, the PNC determines which device will be granted permission to transmit (when more than one device has submitted a transmit request) (element 710). This may be done according to some criteria establishing priority. One method is a round robin method, in which each requesting device is granted permission to transmit in its turn. Once the transmit device is selected by the PNC, the PNC directs its transmit antenna to the selected device that requested permission to transmit (element 712). The PNC then transmits to the selected device a grant of permission to transmit to the devices designated to receive the transmission (element 714). The PNC then transmits instructions to each designated device to receive (element 716). After all the grants have been made, the designated receive devices will point their antennas to the selected transmit device and the selected transmit device transmits to the designated receive devices (element 718).

Thus, some embodiments comprise a method implemented by a piconet controller for allocating time of a superframe to a plurality of devices in a network of the piconet controller. The method comprises, during a polling process, directing a beam of an antenna of the piconet controller to each of the devices in succession. When directing the beam toward one of the devices during the polling process, the piconet controller sends a polling message to the device and then receives a transmit request from the device. The transmit request designates one or more devices to receive the transmission of the device requesting to transmit. During a grant process, the method comprises directing a beam of the antenna of the piconet controller to a device from which a transmit request was received during the polling process and transmitting from the piconet controller to that device permission to transmit in the time alloted. Also during the grant process, the piconet controller transmits grants to receive to the devices designated to receive.

The method may further comprise determining which of a plurality of devices submitting transmit requests during the polling process will transmit next. This is the case when transmit requests are received by more than one device during the polling process. In some embodiments, the method for determining which of the plurality of devices will transmit next is done by a round robin process, wherein each device is granted permission to transmit in its turn. The method may further comprise broadcasting by the piconet controller time slot allocation information to devices in the network. In some embodiments, the polling process and the grant process occur in the same superframe, thereby contributing to efficiency of time slot allocation. In some embodiments, directing a beam of the antenna comprises electronically steering the antenna beam. Further, in some embodiments, a transmit request comprises a request for a duration of time to transmit.

Some embodiments of the invention are implemented as a program product for use with a computer system such as, for example, the computer 100 shown in FIG. 1. The program product could be used on other computer systems or processors. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); and (ii) alterable information stored on writable storage media (e.g., floppy disks within a diskette drive or hard-disk drive). Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-accessible format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Thus, another embodiment of the invention provides a machine-accessible medium containing instructions effective, when executing by a machine, to cause the machine to perform a series of operations for allocating time slots to devices in a network of a piconet controller. The operations comprise, during a polling process, directing a beam of an antenna of the piconet controller to each of the devices in succession. When directing the beam toward a device during the polling process, the operations comprise sending a polling message to the device and receiving a transmit request from the device, wherein the transmit request designates one or more devices to receive. During a grant process, the operations comprise directing a beam of the antenna of the piconet controller to a device from which a transmit request was received during the polling process and transmitting from the piconet controller to that device permission to transmit. Also during the grant process, the operations comprise transmitting grants to receive to the devices designated to receive. The operations may further comprise determining which of a plurality of devices submitting transmit requests during the polling process will transmit next. In some embodiments the polling process and the grant process occur in the same superframe. In some embodiments a transmit request comprises a request for a duration of time to transmit.

The present invention and some of its advantages have been described in detail for some embodiments. It should be understood that various changes, substitutions and alterations can be made herein without departing from the spirit and scope of the invention as defined by the appended claims. An embodiment of the invention may achieve multiple objectives, but not every embodiment falling within the scope of the attached claims will achieve every objective. Moreover, the scope of the present application is not intended to be limited to the particular embodiments of the process, machine, manufacture, composition of matter, means, methods and steps described in the specification. One of ordinary skill in the art will readily appreciate from the disclosure of the present invention that processes, machines, manufacture, compositions of matter, means, methods, or steps, presently existing or later to be developed are equivalent to, and fall within the scope of, what is claimed. Accordingly, the appended claims are intended to include within their scope such processes, machines, manufacture, compositions of matter, means, methods, or steps.

What is claimed is:

1. A piconet controller for allocating time slots for wireless devices in a network of the piconet controller, the piconet controller comprising:
   memory to store time duration allocation information and requests to transmit received from one or more of the devices in the network;
   a processor to poll each of the devices in succession by changing the direction of a selectively directive antenna of the piconet controller, to transmit polling messages to the devices and to receive transmit requests from one or more of the devices in response to the polling messages, to grant permission to transmit to one of the devices in response to receiving the transmit requests from the one or more devices, and to grant permission to receive to one or more other of the devices in response to receiving the transmit requests, wherein:
      granting permission to transmit comprises granting permission to transmit after completion of polling the devices in succession; and
   a transceiver with the selectively directive antenna to communicate polling messages and permission grants to the devices and to receive transmit requests from the devices.

2. The piconet controller of claim 1, wherein:
   the processor receives transmit requests from a plurality of the devices; and
   the processor further selects according to criteria which of the plurality of devices requesting permission to transmit during the polling will be granted permission to transmit next.

3. The piconet controller of claim 1, wherein the processor further processes a transmit request to determine which of the one or more other devices is to receive from the device to which permission to transmit is granted.

4. The piconet controller of claim 1, wherein the processor further specifies a transmit time duration allocated to a transmitting device.

5. The piconet controller of claim 1, wherein the selectively directive antenna of the transceiver comprises a steerable phased array antenna.

6. The piconet controller of claim 1, wherein a transmit request comprises a requested transmit time duration.

7. The piconet controller of claim 1, wherein a transmit request comprises addresses of devices to receive a transmission from the one device to which permission to transmit is granted.

8. A method implemented by a piconet controller for allocating time slots of a superframe to a plurality of devices in a network of the piconet controller, comprising:
   polling the plurality of devices by directing a directive beam of an antenna of the piconet controller to the plurality of devices one by one in succession by:
      sending a polling message to the devices one by one in succession;
      receiving a transmit request from at least one of the devices in response to the polling message, wherein a transmit request designates one or more devices to receive; and
      directing a directive beam of the antenna of the piconet controller to one of the devices from which a transmit request was received in response to receiving the transmit request from the one of the devices; and
   transmitting to that device a grant of permission to transmit in response to receiving the transmit request from the one of the devices; and transmitting grants to receive to the devices designated to receive by the transmit request, wherein:
      granting permission to transmit comprises granting permission to transmit after polling after completion of polling the plurality of devices in succession.

9. The method of claim 8, further comprising determining which of a plurality of devices submitting transmit requests during the polling will transmit next.

10. The method of claim 9, wherein determining which of the plurality of devices will transmit next is done by a round robin process.

11. The method of claim 8, further comprising evaluating addresses in a transmit request to determine which devices are designated to receive a transmission from the device from which the transmit request is received.

12. The method of claim 8, further comprising broadcasting by the piconet controller time slot allocation information to devices in the network.

13. The method of claim 8, wherein the polling occurs during a superframe and the grant of permission to transmit also occurs during the superframe.

14. The method of claim 13, wherein:
the method further comprises:
the piconet controller allocating a time slot to transmit to another of the devices in the network of the piconet controller during the superframe; and
the piconet controller receiving from the other device during the superframe a message that the other device does not require the allocation of time during the superframe;
the polling comprises polling the plurality of devices during the superframe in response to receiving the message; and
the granting permission to transmit comprises granting to the one of the devices permission to transmit during the superframe.

15. The method of claim 8, wherein directing a beam of the antenna comprises electronically steering the antenna beam.

16. The method of claim 8, wherein a transmit request comprises a request for a duration of time to transmit.

17. The method of claim 8, wherein transmitting grants to receive to the devices designated to receive by the transmit request comprises transmitting grants to receive to a plurality of devices designated to receive by the transmit request.

18. A tangible machine-readable storage medium, wherein the storage medium does not comprise a transitory signal, the storage medium containing instructions for allocating time to devices in the network of a piconet controller, which, when the instructions are executed by a machine, cause said machine to perform operations, comprising:
polling the plurality of devices by directing a directive beam of an antenna of the piconet controller to the plurality of devices one by one in succession by:
sending a polling message to the devices one by one in succession;
receiving a transmit request from at least one of the devices in response to the polling message, wherein a transmit request designates one or more devices to receive; and
directing a directive beam of the antenna of the piconet controller to one of the devices from which a transmit request was received in response to receiving the transmit request from the one of the devices; and
transmitting to the one of the devices a grant of permission to transmit in response to receiving the transmit request from the one of the devices; and
transmitting grants to receive to the devices designated to receive by the transmit request, wherein:
granting permission to transmit comprises granting permission to transmit after polling after completion of polling the plurality of devices in succession.

19. The tangible machine readable storage medium of claim 18, wherein the operations further comprise determining which of a plurality of devices submitting transmit requests during the polling will transmit next.

20. The tangible machine readable storage medium of claim 18, wherein:
the operations further comprise:
the piconet controller allocating a time slot to transmit to another of the devices in the network of the piconet controller during a superframe; and
the piconet controller receiving from the other device during the superframe a message that the other device does not require the allocation of time during the superframe;
the polling comprises polling the plurality of devices during the superframe in response to receiving the message; and
the granting permission to transmit comprises granting to the one of the devices permission to transmit during the superframe.

21. A method for allocating time in a piconet to a plurality of devices in a network of a piconet controller, comprising
pointing a directive antenna of each of the plurality of devices to the piconet controller;
polling the plurality of devices by directing a directive beam of an antenna of the piconet controller to the plurality of devices one by one in succession by:
sending a polling message to the devices one by one in succession;
receiving a transmit request from at least one of the devices in response to the polling message, wherein a transmit request designates one or more devices to receive; and
directing a directive beam of the antenna of the piconet controller to one of the devices from which a transmit request was received in response to receiving the transmit request from the one of the devices; and
transmitting to the one of the devices a grant of permission to transmit in response to receiving the transmit request from the one of the devices; and transmitting grants to receive to the devices designated to receive by the transmit request, wherein:
granting permission to transmit comprises granting permission to transmit after polling after completion of polling the plurality of devices in succession.

22. The method of claim 21, further comprising determining which of a plurality of devices submitting transmit requests during the polling will transmit next.

23. The method of claim 21, further comprising broadcasting by the piconet controller time slot allocation information to devices in the network.

24. The method of claim 21, wherein the polling process occurs during a superframe and the grant process also occurs during the superframe.

25. The method of claim 24, wherein:
the method further comprises:
the piconet controller allocating a time slot to transmit to another of the devices in the network of the piconet controller during the superframe; and
the piconet controller receiving from the other device during the superframe a message that the other device does not require the allocation of time during the superframe;
the polling comprises polling the plurality of devices during the superframe in response to receiving the message; and
the granting permission to transmit comprises granting to the one of the devices permission to transmit during the superframe.

* * * * *